(12) United States Patent
Gallegos-Lopez et al.

(10) Patent No.: US 8,203,236 B2
(45) Date of Patent: *Jun. 19, 2012

(54) DUAL VOLTAGE-SOURCE INVERTER SYSTEM AND METHOD

(75) Inventors: Gabriel Gallegos-Lopez, Torrance, CA (US); Milun Perisic, Torrance, CA (US); Silva Hiti, Redondo Beach, CA (US); George John, Cerritos, CA (US); Gregory S. Smith, Woodland Hills, CA (US); Khiet Le, Mission Viejo, CA (US); Duc Q. Phan, Gardena, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 282 days.

This patent is subject to a terminal disclaimer.

(21) Appl. No.: 12/621,173

(22) Filed: Nov. 18, 2009

(65) Prior Publication Data

US 2011/0115294 A1    May 19, 2011

(51) Int. Cl.
*H02J 9/00*   (2006.01)
(52) U.S. Cl. ............................................. 307/64; 307/86
(58) Field of Classification Search .................... 307/64, 307/86
See application file for complete search history.

(56) References Cited

U.S. PATENT DOCUMENTS 7,719,138 B2 *   5/2010   Gallegos-Lopez et al. ..... 307/43

* cited by examiner

*Primary Examiner* — Robert L. Deberadinis
(74) *Attorney, Agent, or Firm* — Ingrassia Fisher & Lorenz P.C.

(57) ABSTRACT

Systems and methods are disclosed for a dual voltage-source inverter system. The systems and methods selectively couple a first voltage source and a second voltage source to an inverter via a controllable switch.

20 Claims, 3 Drawing Sheets

DUAL VOLTAGE-SOURCE INVERTER SYSTEM AND METHOD

TECHNICAL FIELD

Embodiments of the present invention relate generally to electric power converters, and more particularly relate to DC-AC inverters.

BACKGROUND

An inverter is an electronic circuit for converting direct current (DC) to alternating current (AC). Inverters are used in a wide range of applications, from small uninterruptible power supplies for a computer to large electric power transport utility applications, and variable speed industrial drives. A common application is for DC voltage source utilization such as a system designed to provide 115 volts AC from the 12 volts DC source provided in an automobile, the 12 volts DC source is first boosted over 200 V DC by a DC/DC converter, and then an inverter converts the high DC voltage to 115 volts AC. An inverter supplies AC power to operate equipment that is normally supplied from a power line or to power an AC electric motor. Inverters are also used to provide a source of AC power from fuel cell or photovoltaic solar cell power supplies. Uninterruptible power supplies are another type of application. Uninterruptible power supplies may use batteries to store power and an inverter to supply AC power from the batteries when power lines are not functioning or unavailable. When the power lines are restored, the batteries are recharged. High-voltage direct current power transmission is another application, where AC power is rectified into a high voltage DC and transmitted to another location. At the receiving location, an inverter converts the DC back to AC.

The term inverter has its origin from electro-mechanical converters. Historically, DC-to-AC power conversion was accomplished using electro-mechanical rotary converters coupling an AC electric motor to a DC electric generator in order to convert an AC input into a DC output. If the connections to a converter are inverted, the input is DC and the output is AC, so the historical inverted converter gave rise to the term inverter.

These early electro-mechanical devices were replaced with vacuum and gas filled tube switches in inverter circuits. Because they have higher voltage and current ratings, transistor semiconductor switches that can be turned on and turned off by means of control signals have become the preferred switching components for use in inverter circuits. In particular, the insulated gate bipolar transistors (IGBTs) are, at present, the most commonly used transistors for high current application such as for hybrid vehicles.

Three-phase is a common type of AC that can be produced by an inverter and used for electric power applications. It is a type of multi-phase system used to power motors, transformers, and many other devices. Three-phase has properties that make it very desirable in electric power systems: The phase currents sum to zero in a properly connected load making it possible to eliminate the AC neutral conductor; power transfer into a balanced load is constant reducing generator and motor vibrations; and three-phase systems can produce a magnetic field that rotates in a specified direction, which simplifies the design of electric motors. Three is the lowest phase order with these properties.

An important type of three-phase load is an electric motor. A three-phase electric motor has a simple design, high torque at low RPM, and high efficiency. Three-phase motors are used for pumps, fans, blowers, compressors, electric and diesel-electric locomotives and many other kinds of motor-driven equipments. Three-phase motors are more compact, less expensive, vibrate less, last longer than a single-phase motor of the same power rating, and are subsequently preferred over single-phase for motors above 10 HP (7.5 kW). Hybrid, fuel cell, and electric vehicles often use three-phase motors because their high starting torque can be used to accelerate a vehicle to a useful speed. A three-phase motor can also be used as a generator for regenerative braking.

Hybrid, fuel cell, and electric vehicles often have more than one source of DC power. For example, these vehicles may use electric batteries, ultra-capacitors, fuel cells, and fuel powered generators, all producing DC power. Moreover, the different sources will often have different voltages requiring voltage conversion to combine their electrical voltages. A traditional approach is to use a DC/DC converter, which is a complex and expensive piece of equipment.

Accordingly, it is desirable to have a simple system for using two sources for a three-phase inverter without using a DC/DC converter. Furthermore, other desirable features and characteristics will become apparent from the subsequent detailed description and the appended claims, taken in conjunction with the accompanying drawings and the foregoing technical field and background.

BRIEF SUMMARY

Systems and methods are disclosed for a dual voltage-source inverter system. The systems and methods selectively couple a first voltage source and a second voltage source to an inverter via a controllable switch.

In one embodiment, a dual voltage-source inverter system includes an inverter, a first voltage source, a second voltage source, a controllable switch, and a controller. The inverter has a first DC input, a second DC input, and a plurality of AC outputs. The inverter is coupled to receive inverter control signals and is configured, in response thereto, to selectively convert DC current to AC current. The first voltage source has a first voltage magnitude and is coupled to the first DC input. The second voltage source has a second voltage magnitude that is less than or equal to the first voltage magnitude, and is coupled to the first DC input and the second DC input. The controllable switch is connected between the first voltage source and the second DC input. The controllable switch is coupled to receive switch control signals and is configured, in response thereto, to selectively couple the first voltage source to the second DC input. The controller is coupled to the inverter and the controllable switch. The controller is configured to supply the inverter control signals and the switch control signals to thereby control current flow through the controllable switch and the inverter.

In another embodiment, a dual voltage-source inverter system includes an inverter, a first voltage source, a second voltage source, a controllable switch, and a controller. The inverter includes a plurality of freewheeling diodes and has a first DC input, a second DC input, and a plurality of AC outputs. The inverter is coupled to receive inverter control signals and is configured, in response thereto, to selectively convert DC current to AC current. The first voltage source has a first voltage magnitude, and is coupled to the first DC input and to a portion of the plurality of freewheeling diodes. The second voltage source has a second voltage magnitude that is less than or equal to the first voltage magnitude, and is coupled to the first DC input and the second DC input. The controllable switch is connected between the first voltage source and the second DC input. The controllable switch is coupled to receive switch control signals and is configured, in response thereto, to selectively couple the first voltage source to the second DC input. The controller is coupled to the inverter and the controllable switch. The controller is configured to supply the inverter control signals and the switch control signals to thereby control current flow through the controllable switch and the inverter.

In still another embodiment, a method for operating an inverter system includes connecting a first DC voltage source to an inverter, and selectively connecting a second DC voltage source to the inverter. The inverter is controlled to convert DC current supplied from the first DC voltage source and selectively supplied by the second DC voltage source to AC current.

BRIEF DESCRIPTION OF THE DRAWINGS

Embodiments of a dual voltage-source inverter system and method will hereinafter be described in conjunction with the following drawing figures, wherein like numerals denote like elements and wherein.

DETAILED DESCRIPTION

Figure 1:
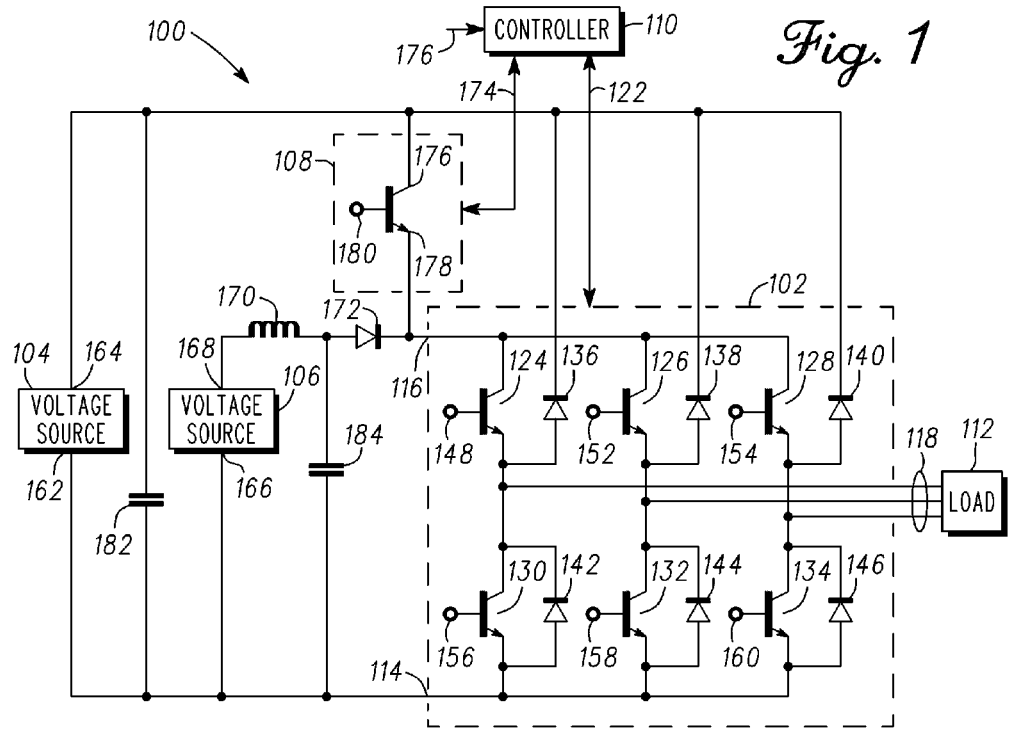
FIG. 1 depicts a schematic representation of an embodiment of a dual voltage-source inverter system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of vehicle applications and that the system described herein is merely one example embodiment of the invention.

For the sake of brevity, conventional techniques and components related to vehicle electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in FIGS. 1-2 depict example arrangements of elements, additional intervening elements, devices, features, or components may be present in an embodiment of the invention (assuming that the functionality of the system is not adversely affected).

Embodiments of the invention are described herein in the context of one practical non-limiting application, namely, a dual voltage-source inverter system for a vehicle with a three-phase electric motor. In this context, the example technique is applicable to operation of a system suitable for a vehicle. Embodiments of the invention, however, are not limited to such vehicle applications, and the techniques described herein may also be utilized in other power conversion systems.

Three-phase inverters are used for variable-frequency drive applications. There are many different power circuit topologies and control strategies used in inverter designs. Different design approaches are used to address various issues that may be more or less important depending on the way that the inverter is intended to be used.

Figure 2:
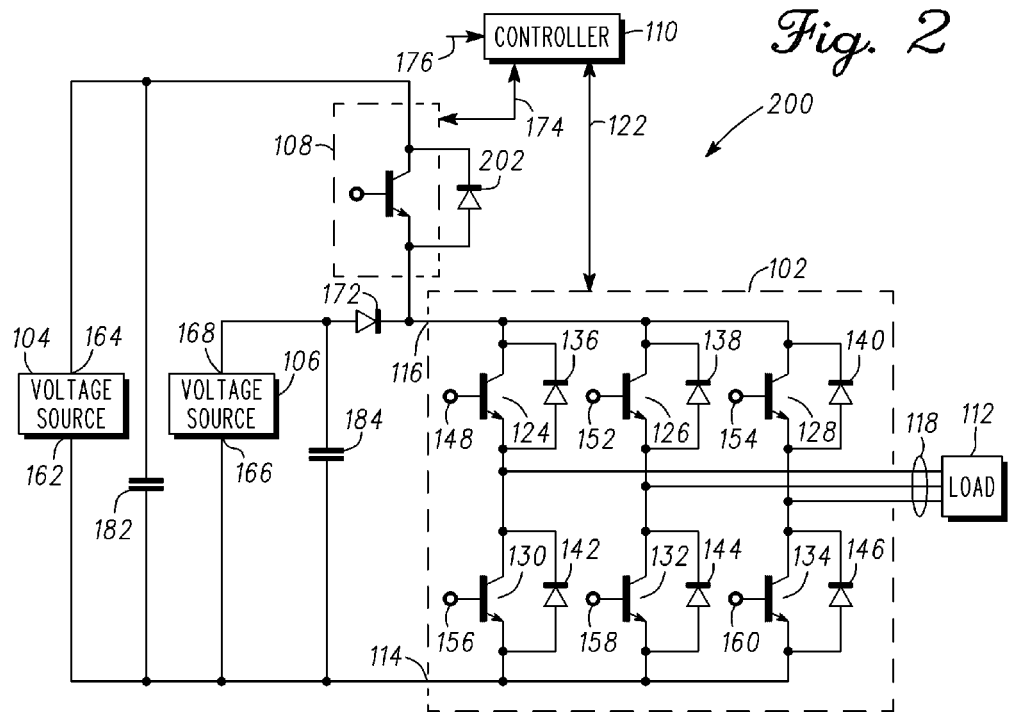
FIG. 2 depicts a schematic representation of another embodiment of a dual voltage-source inverter system.

Referring now to FIG. 1, a schematic representation of an exemplary embodiment of a dual voltage-source inverter system 100 is depicted, and includes an inverter 102, a first voltage source 104, a second voltage source 106, a controllable switch 108, a controller 110, and an AC load 112. The depicted system 100 is preferably used in a vehicle powered by an electric traction motor. It will nonetheless be appreciated that the system 100 may be used in any one of numerous other systems and environments where DC-to-AC conversion is needed or desired. It will additionally be appreciated that the system 100 may include various electrical components, circuits, controller units, and subsystems beyond those depicted in FIG. 1. Descriptions of these additional components, circuits, controller units, and subsystems are not needed to fully describe or enable the instant invention and, therefore, will not be provided herein.

The inverter 102 includes a first DC input 114, a second DC input 116, and a plurality of AC outputs 118. The first DC input 114 is coupled to the first voltage source 104 and the second voltage source 106. The second DC input 116 is coupled to the second voltage source 106 and, as will be described further below, is selectively coupled to the first voltage source 104 via the controllable switch 108. The inverter 102 is also coupled to receive inverter control signals 122 from the controller 110 and is configured, in response to the inverter control signals 122, to selectively convert DC current supplied from one or both of the first and second voltage sources 104, 106 to AC current. The AC current is supplied, via the plurality of AC outputs 118, to the load 112.

The inverter 102 may be variously implemented, but in the depicted embodiment it is implemented using a common single voltage source inverter configuration, and may be a three-phase or other multi-phase inverter. The depicted inverter 102 includes a plurality of controlled switches (124, 126, 128, 130, 132, 134), a plurality of freewheeling diodes (136, 138, 140, 142, 144, 146), and switch control terminals (148, 152, 154, 156, 158, 160). As is generally known, current flow through each of the controlled switches is controlled via their respective control terminals. In this regard, the control terminals are coupled to receive the inverter control signals 122 from the controller 110 (for the sake of clarity, the individual inverter control signals 122 from controller 110 to each control terminal are not depicted in FIG. 1). In the depicted embodiment, each of the controlled switches is implemented using an insulated gate bipolar transistor (IGBT) having collector, a base, and an emitter. It will be appreciated however, that this is merely exemplary, and that other suitable devices may also be used.

The freewheeling diodes (136, 138, 140, 142, 144, 146) are connected within the inverter 102 to provide bidirectional current flow. More specifically, at least in the embodiment depicted in FIG. 1, three of the freewheeling diodes (142, 144, 146) are each connected between the emitter and the collector of one of the lower controlled switches (130, 132, 134), and the other three freewheeling diodes (136, 138, 140) are each connected between the emitter of one of the upper controlled switches (124, 126, 128) and the first voltage source 104. With this configuration, switching currents and current supplied from the load 112 may be used to charge the first voltage source 104. For example, depending on its implementation, the load 112 may recharge the first voltage source 104 during a regenerative braking operation of a vehicle. During a regenerative braking operation, the load 112 may supply current (e.g., recharge current) to the inverter 102, which is in turn supplied to the first voltage source 104 via the upper freewheeling diodes (136, 138, 140).

The first voltage source 104 has a first terminal 162 and a second terminal 164. The first terminal 162 is connected to the inverter 102, and the terminal 164 is connected to the controllable switch 108. As will be described in more detail further below, the first voltage source 104 is configured to selectively supply DC voltage and current to the inverter 102 via the controllable switch 108. The first voltage source 104, as was just described, is additionally coupled to the upper freewheeling diodes (136, 138, 140) in the inverter 102. The first voltage source 104 may be any one of numerous rechargeable DC voltage sources suitable for supporting the operation of a hybrid vehicle. Some non-limiting examples include one or more batteries (such as lead acid, nickel metal hydride, or lithium ion batteries), or one or more ultra-capacitors. The voltage magnitude of the first voltage source 104 is a relatively high DC voltage, which may be in the neighborhood of a couple hundred volts for this application. No matter its specific voltage magnitude, however, it is preferably greater than or equal to that of the second voltage source 106.

The second voltage source 106 also has a first terminal 166 and a second terminal 168. The first terminal 166 is connected to the inverter 102. The second terminal 168 is connected to the inverter 102 and the controllable switch 108, preferably via an inductance 170 and a diode 172. The second voltage source 106 is configured to supply a DC voltage and current to the inverter 102 via the inductance 170 and diode 172. The second voltage source 106 may be any one of numerous DC voltage sources suitable for supporting the operation of a hybrid vehicle. Some non-limiting examples include one or more generators, one or more fuel cells, one or more batteries (such as lead acid, nickel metal hydride, or lithium ion batteries), or one or more ultra-capacitors. The voltage magnitude of the second voltage source 106 is also a relatively high DC voltage, which may be in the neighborhood of a couple hundred volts for this application. Preferably, as was noted above, its voltage magnitude is less than or equal to that of the first voltage source 104.

The controllable switch 108 is coupled between the inverter 102 and the first voltage source 104. More specifically, the controllable switch 108 is connected between the first voltage source second terminal 164 and the inverter second DC input 116. The controllable switch 108 is additionally coupled to receive switch control signals 174 from the controller 110 and is configured, in response to the switch control signals 174, to selectively couple the first voltage source second terminal 164 to the inverter second DC input 116. The controllable switch 108 may be variously implemented, but in the depicted embodiment it is implemented using an IGBT having a collector (first terminal 176), an emitter (second terminal 178), and a gate (control terminal 180). It will be appreciated however, that this is merely exemplary, and that other suitable devices may also be used. The controllable switch first terminal 176 is connected to the first voltage source second terminal 164, the controllable switch second terminal 178 is connected to the inverter second DC input 116, and the controllable switch control terminal is connected to receive the switch control signals 174.

The load 112 is coupled to the inverter AC outputs 118 and receives the AC current supplied by the inverter 102. The load 112 may be any one of numerous suitable AC loads. In a particular preferred embodiment, in which the inverter system 100 is implemented in a vehicle, the load 112 is an AC electric machine that provides power or additional power to a vehicle powertrain, and may also provide regenerative braking. Various types of AC electric machines are often used in such environments because of the relatively high power, and relatively high load torque, these devices supply. The load 112, when implemented as an AC electric machine, may be, without limitation, an induction or synchronous three-phase or multi-phase AC electric machine.

Before proceeding further, it is noted that the depicted inverter system 100 additionally includes a pair of capacitors; namely, a first capacitor 182 and a second capacitor 184. The first capacitor 182 is connected in parallel with the first voltage source 104, between the first voltage source first and second terminals 162, 164. The second capacitor 184 is connected to the second voltage source 106 via the inductance 170, between the second voltage source first and second terminals 166, 168. The first and second capacitors 182, 184 both provide power conditioning and smooth voltage surges of the inverter 102. The first and second capacitors 182, 184 may be implemented using ultra-capacitors or as any one of numerous other suitable capacitance elements. The first and second capacitors 182, 184 may also represent the capacitance that will naturally exist in other components of the hybrid vehicle such as, for example without limitation, an active electrical bus, and/or power electronics. Each of these devices may contain capacitors, power output stages, etc. The capacitance of the first and second capacitors 182, 184 may vary from one application to another, depending on the power drawn by the load 112.

The controller 110, as previously mentioned, supplies the inverter control signals 122 and the switch control signals 174 to the inverter 102 and the controllable switch 108, respectively. The controller 110 thus controls current flow through the inverter 102 and the controllable switch 108. In particular, the controller 110 controls current flow through the inverter 102 via the inverter control signals 122. The controller 110 also controls whether DC current is supplied to the inverter 102 from both the first and second voltage sources 104, 106 or from just the second voltage source 106, via the switch control signals 174. It may be readily apparent to the skilled artisan that when the switch control signals 174 command the controllable switch 108 to couple the first voltage source second terminal 164 to the inverter second DC input 116, then the inverter 102 will be supplied with DC current from the first voltage source 104. Conversely, when the switch control signals 174 command the controllable switch 108 to decouple the first voltage source second terminal 164 from the inverter second DC input 116, then the inverter 102 will be supplied with DC current from only the second voltage source 106.

The controller 110 may be implemented as part of a vehicle computing module, a centralized vehicle processor, a subsystem computing module devoted to the switch arrangement, or the like. In some embodiments the controller 110 may supply the inverter control signals 122 and the switch control signals 174 in response to command signals 176 and feedback signals (not depicted), in accordance with the current state of the vehicle or required power flow, e.g., whether the regenerative braking mode or the normal operating mode is active. The controller 110 is generally a software-controlled device, and controls the inverter 102 to supply a three-phase AC current to the load 112 during vehicle operation.

FIG. 2 is a schematic representation of an alternative embodiment of a dual voltage-source inverter system 200, which is also suitable for a hybrid vehicle or electric vehicle. The system 200 is configured substantially similar to the system 100 depicted in FIG. 1, and common features, functions, and elements will not be redundantly described here. It may be readily seen, however, that the upper freewheeling diodes (136, 138, 140) of system 200 are not connected between the emitter of one of the upper controlled switches (124, 126, 128) and the first voltage source 104. Rather, these freewheeling diodes (136, 138, 140) are each connected between the emitter and collectors of one of the upper controlled switches (124, 126, 128). Moreover, an additional diode 202 is connected between the emitter and collector of the controllable switch 108. Current to recharge the first voltage source 104 flows through this diode 202 in this embodiment.

Figure 3:
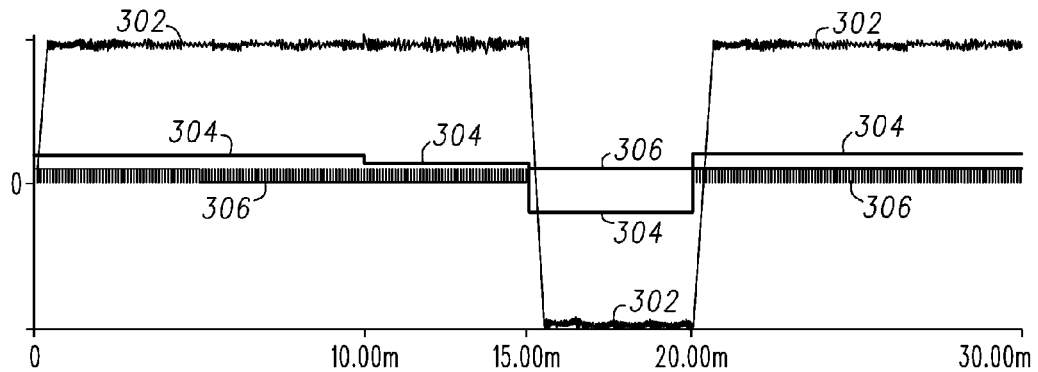
FIG. 3 depicts 108 switch control related to machine torque.
Figure 4:
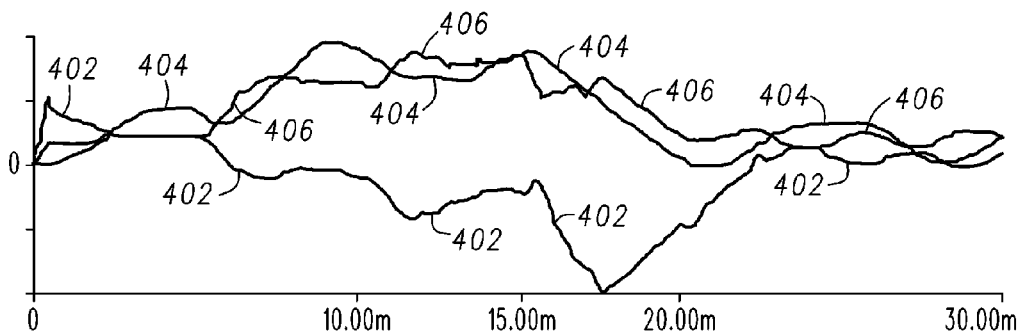
FIG. 4 depicts decrease in average current from second voltage source.
Figure 5:
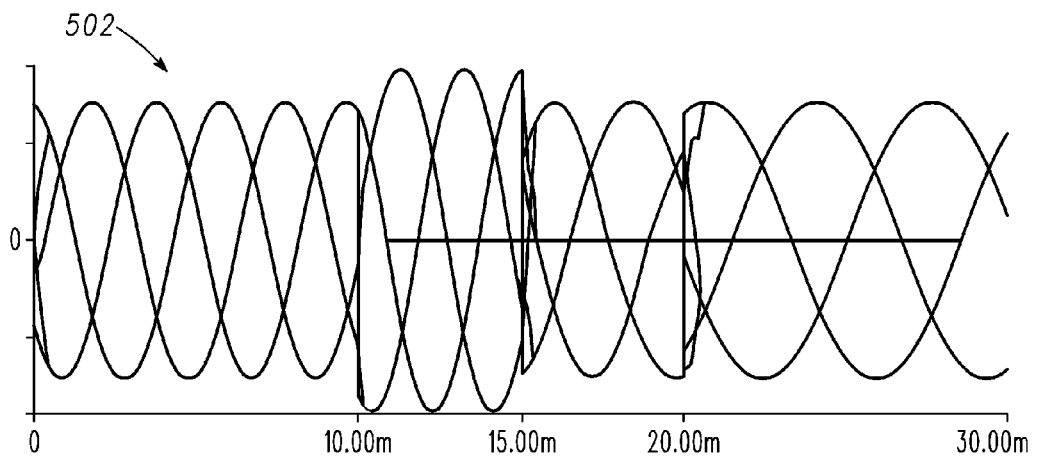
FIG. 5 depicts three phase inverter current output amplitudes increase at 10 milliseconds.

Operation of the inverter system 100 depicted in FIG. 1 may be understood by viewing the graphs depicted in FIGS. 3-5, which depict various electrical parameters within the inverter system 100 during a portion (e.g., 30 msec length) of an exemplary operational cycle. Referring first to FIGS. 3 and 4, machine torque (302), commanded $I_q$ (304) (e.g., commanded q-axis current), and the switch control signal 174 (306) supplied to the controllable switch 108 are graphically depicted in FIG. 3, and the average current supplied from the first voltage source 104 (402), the average current supplied from the second voltage source 106 (404), and the average of the sum of these currents (406) (e.g., the average current supplied to the inverter 102) are graphically depicted in FIG. 4. Initially, the system 100 is controlled so that the machine (e.g., load 112) supplies a positive torque. The commanded $I_q$ (and thus the commanded $I_d$, which is non-depicted and corresponds to the d-axis current) are set to ensure the machine 112 supplies the desired torque. During this time, the controllable switch 108 is also controlled to selectively connect the first voltage source 104 to the inverter 102, and thus selectively draw current, as needed, from the first voltage source 104. As FIG. 4 depicts, the first voltage source 102 and second voltage source 104 initially supplies 50% each of the total average current (406) to the inverter 102 from 1 to 5 milliseconds. However, within the first five milliseconds, this changes to where the second voltage source 106 is supplying more current.

The commanded $I_q$ (304) remains constant for the first 10 milliseconds, at which time it is lowered. When this occurs, as FIG. 4 shows most clearly, a significant amount current (402) flows from the inverter 102 back to the first voltage source 102. The torque (302), however, remains constant. With quick reference to FIG. 5, which depicts the 3-phase currents (502) supplied by the inverter 102 to the machine 112, it is seen that the 3-phase current amplitudes increase at 10 milliseconds. It may thus be seen that the inverter system 100 may be controlled to supply a relatively constant torque while simultaneously supplying current to, and recharging, the first voltage source 102.

Between 15 and 20 milliseconds, the system 100 is controlled in a regeneration mode, whereby the machine 112 acts as a generator and supplies electrical power. Thus, the machine torque (302) and commanded $I_q$ (304) are depicted as negative values in FIG. 3. During this time period the switch control signal 174 (306) is such that the controllable switch 108 is continuously on. As FIG. 4 depicts, the average current (402) supplied to the first voltage source 104 increases to a peak and then decreases during this 5 millisecond time period, the average current (404) from the second voltage source decreases to near zero, and the total average current (406) significantly decreases.

At 20 milliseconds the system 100 is once again controlled so that the machine 112 supplies a positive torque. It is seen that the commanded $I_q$ (304) is returned to its original value, and the switch control signal 174 (306) selectively modulates the controllable switch 108 on and off resulting in the average currents (402, 404, 406) depicted in FIG. 4.

Figure 6:
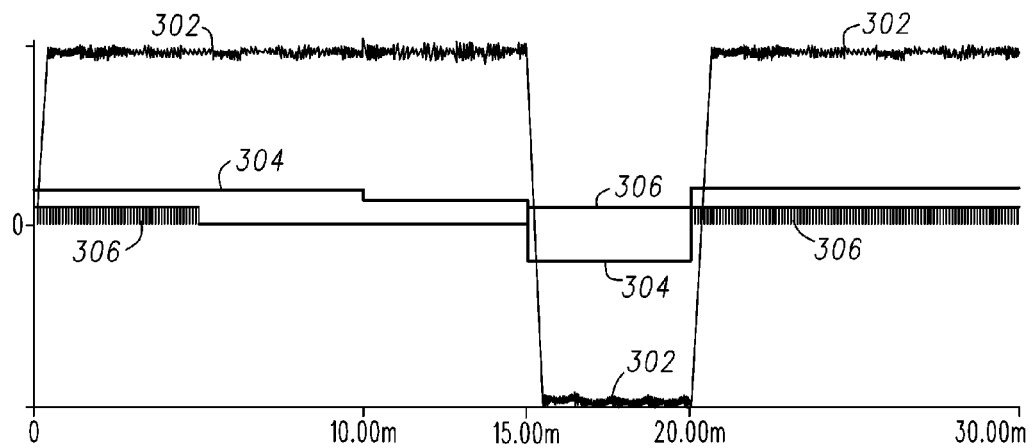
FIG. 6 depicts 108 switch control related to machine torque.
Figure 7:
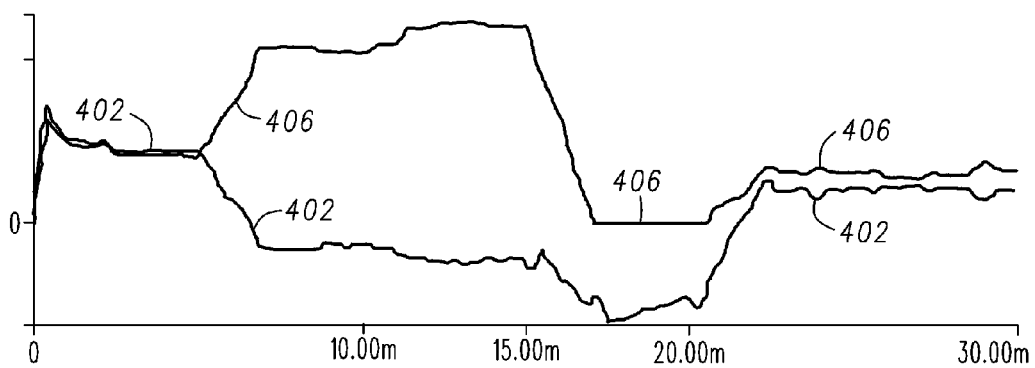
FIG. 7 depicts decrease in average current from second voltage source.
Figure 8:
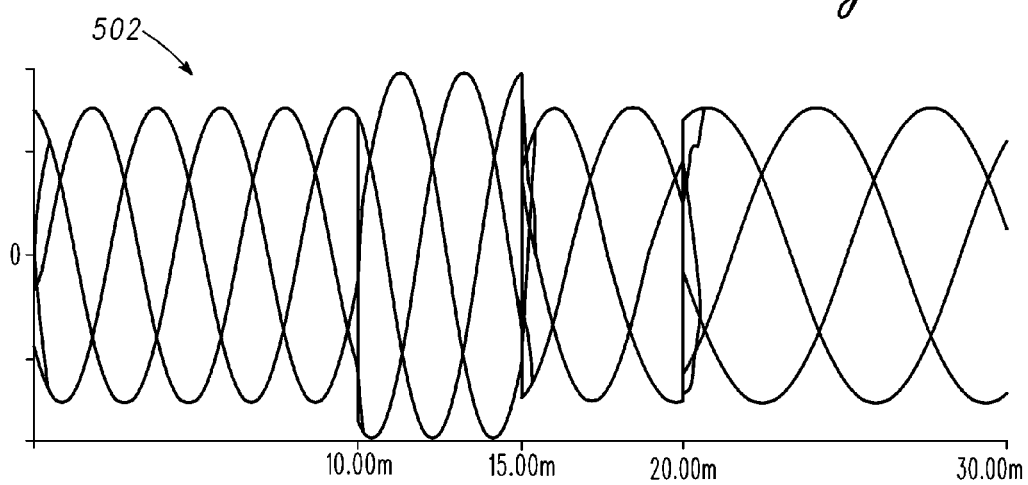
FIG. 8 depicts three phase inverter current output amplitudes increase at 10 milliseconds.

For completeness, the operation of the alternative inverter system 200 is depicted in FIG. 2, for the same 30 millisecond operational cycle as the one depicted in FIGS. 3-5, is depicted in FIGS. 6-8. These figures depict the same electrical parameters (with the exception of the average total current to the inverter 102) within the inverter system 200 during this operational cycle. Common reference numerals in FIGS. 3-8 are used to depict the same electrical parameters. The skilled artisan will readily understand the operation of the inverter system 200 from FIGS. 6-8. Thus, a detailed description of these figures will not be provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A dual voltage-source inverter system, comprising:
   an inverter having a first DC input, a second DC input, and a plurality of AC outputs, the inverter coupled to receive inverter control signals and configured, in response thereto, to selectively convert DC current to AC current;
   a first voltage source having a first voltage magnitude, the first voltage source coupled to the first DC input;

a second voltage source having a second voltage magnitude that is less than or equal to the first voltage magnitude, the second voltage source coupled to the first DC input and the second DC input;

a controllable switch connected between the first voltage source and the second DC input, the controllable switch coupled to receive switch control signals and configured, in response thereto, to selectively couple the first voltage source to the second DC input; and a controller coupled to the inverter and the controllable switch, the controller configured to supply the inverter control signals and the switch control signals to thereby control current flow through the controllable switch and the inverter.

2. The system of claim 1, further comprising:
a diode having an anode and a cathode, the anode coupled to the second voltage source, the cathode connected to the second DC input.

3. The system of claim 2, further comprising:
an inductance coupled between the second voltage source and the anode.

4. The system of claim 1, wherein:
the first voltage source comprises a first terminal and a second terminal, the second terminal connected to the first DC input; and
the controllable switch comprises a transistor having a third terminal, a fourth terminal, and control input, the third terminal coupled to the first terminal, the fourth terminal coupled to the second DC input, and the control input coupled to receive the switch control signals.

5. The system of claim 4, further comprising:
a diode having an anode and a cathode, the anode connected to the fourth terminal, the cathode connected to the third terminal.

6. The system of claim 1, wherein:
the inverter comprises a plurality of freewheeling diodes;
the first voltage source comprises a first terminal and a second terminal, the second terminal connected to the first DC input; and
a portion of the plurality of freewheeling diodes are coupled to the first terminal of the first voltage source.

7. The system of claim 1, further comprising:
a first capacitance electrically connected in parallel with the first voltage source; and
a second capacitance electrically connected to the second voltage source via an inductance.

8. The system of claim 1, wherein the inverter comprises a multi-phase inverter.

9. The system of claim 1, wherein the controller is further configured to control duty cycles of:
the first control inputs; and
the second control input.

10. The system of claim 1, further comprising a multi-phase load coupled to the AC outputs.

11. A dual voltage-source inverter system, comprising:
an inverter comprising a plurality of freewheeling diodes and having a first DC input, a second DC input, and a plurality of AC outputs, the inverter coupled to receive inverter control signals and configured, in response thereto, to selectively convert DC current to AC current;

a first voltage source having a first voltage magnitude, the first voltage source coupled to the first DC input and to a portion of the plurality of freewheeling diodes;

a second voltage source having a second voltage magnitude that is less than or equal to the first voltage magnitude, the second voltage source coupled to the first DC input and the second DC input;

a controllable switch connected between the first voltage source and the second DC input, the controllable switch coupled to receive switch control signals and configured, in response thereto, to selectively couple the first voltage source to the second DC input; and a controller coupled to the inverter and the controllable switch, the controller configured to supply the inverter control signals and the switch control signals to thereby control current flow through the controllable switch and the inverter.

12. The system of claim 11, further comprising:
a diode having an anode and a cathode, the anode coupled to the second voltage source, the cathode connected to the second DC input.

13. The system of claim 12, further comprising:
an inductance coupled between the second voltage source and the anode.

14. The system of claim 11, wherein:
the first voltage source comprises a first terminal and a second terminal, the second terminal connected to the first DC input; and
the controllable switch comprises a transistor having a third terminal, a fourth terminal, and control input, the third terminal coupled to the first terminal, the fourth terminal coupled to the second DC input, and the control input coupled to receive the switch control signals.

15. The system of claim 11, further comprising:
a first capacitance electrically connected in parallel with the first voltage source; and
a second capacitance electrically connected to the second voltage source via an inductance.

16. The system of claim 11, wherein the inverter comprises a multi-phase inverter.

17. The system of claim 11, wherein the controller is further configured to control duty cycles of:
the first control inputs; and
the second control input.

18. The system of claim 11, further comprising a multi-phase load coupled to the AC outputs.

19. A method for operating an inverter system, the method comprising the steps of:
connecting a first DC voltage source to an inverter;
selectively connecting a second DC voltage source to the inverter; and
controlling the inverter to convert DC current supplied from the second DC voltage source and selectively supplied by the first DC voltage source to AC current.

20. The method of claim 19, further comprising:
selectively supplying DC current from the inverter to the first DC voltage source to thereby selectively recharge the first DC voltage source.

* * * * *